United States Patent [19]

Neal et al.

[11] Patent Number: 5,045,663
[45] Date of Patent: Sep. 3, 1991

[54] SYSTEM FOR CONTROL OF FLUSHING FLOW IN A SPARK DISCHARGE (EDM) MACHINE

[75] Inventors: James T. Neal, Mooresville; Darrel D. Huff, Jr., Huntersville, both of N.C.

[73] Assignee: Elox Corporation, Davidson, N.C.

[21] Appl. No.: 485,615

[22] Filed: Feb. 27, 1990

[51] Int. Cl.[5] .......................... B23H 7/02; B23H 7/36
[52] U.S. Cl. ........................... 219/69.12; 204/224 M; 219/69.14
[58] Field of Search ............... 219/69.12, 69.14, 69.17; 204/224 M, 129.7

[56] References Cited

U.S. PATENT DOCUMENTS

| 4,208,256 | 6/1980 | Inoue | 204/129.2 |
| 4,393,292 | 7/1983 | Inoue | 219/69.17 |
| 4,409,458 | 10/1983 | Inoue | 219/69.14 |
| 4,414,456 | 11/1983 | Inoue | 219/69.12 |
| 4,510,366 | 4/1985 | Inoue | 219/69.17 |
| 4,575,603 | 3/1986 | Inoue et al. | 219/69.14 |
| 4,607,149 | 8/1986 | Inoue | 219/69.12 |
| 4,629,854 | 12/1986 | Inoue et al. | 219/69.14 |
| 4,634,825 | 1/1987 | Budin et al. | 219/69.12 |
| 4,709,131 | 11/1987 | Del Bello et al. | 219/69.17 |
| 4,833,290 | 5/1989 | Obara | 219/69.12 |

FOREIGN PATENT DOCUMENTS

| 109230 | 6/1983 | Japan | 219/69.14 |
| 164721 | 7/1986 | Japan | 219/69.14 |

Primary Examiner—Geoffrey S. Evans
Attorney, Agent, or Firm—Neuman, Williams, Anderson & Olson

[57] ABSTRACT

A control system for flushing fluid flow in an EDM machine provides independent control of flow characteristics at the upper and lower nozzle outlets. The control system operates in a flow control mode and a pressure control mode. In the pressure control mode, pressure transducers are utilized to provide a feed-back signal.

10 Claims, 4 Drawing Sheets

5,045,663

SYSTEM FOR CONTROL OF FLUSHING FLOW IN A SPARK DISCHARGE (EDM) MACHINE

BACKGROUND OF THE INVENTION

1. Field of the Invention

This invention relates to spark discharge, electro-erosion machine tools. More particularly, this invention relates to a control system and fluid supply apparatus for regulating the pressure and flow of the flushing fluid that flows through the working gap between a wire and a workpiece in the operation of an electrical discharge machining (EDM) apparatus and for providing flushing at higher pressures for improved performance.

2. Description of the Prior Art

Spark discharge, electro-erosion or electrical discharge machining (EDM) apparatus make use of controlled electrical discharges or sparks to cut through or erode electrically-conductive workpieces. The cutting is achieved by high frequency electrical discharges between a wire that acts as an electrode and a workpiece that acts as a counter-electrode. Pulses of suitable electrical voltage are applied across a gap between the wire and the workpiece known as the working gap, or working area. A dielectric liquid, normally de-ionized water, or oil, is supplied to the working gap. When the voltage across the working gap becomes sufficiently high the dielectric liquid becomes ionized at a point along the wire, breaking down electrically to form an instantaneous and intense conductive channel between the wire and the workpiece. The concentration of high energy at a localized site causes the removal of a discrete quantity of metal from the workpiece. By moving the workpiece relative to the wire, intricate and precise cuts can be made in the workpiece. A numerical control system is generally used to regulate the movement of the workpiece to achieve the desired profile. An example of a process control strategy of an EDM machine and associated numerical control system can be found in Buhler U.S. Pat. No. 4,533,811.

It is important in many applications for the EDM machine to provide cuts of extremely high precision and accuracy. The dielectric medium is circulated through the working zone by the action of flushing. As the cutting operation proceeds, the amount of ions, or ionization, in the dielectric fluid increases. In other words, the deionized water or flushing fluid increases its conductivity when it is contaminated by the products of the erosion process. The fluid must therefore be periodically filtered and deionized in order to maintain the proper conductivity level of the fluid, or the increased conductivity can cause irregularities in the cutting width and exceed the required, precise tolerances.

By continual flushing flow, the contaminated and ionized liquid resulting from the machining action is flushed from the work area providing a replenished source of de-ionized water for subsequent machining. The flushing action also cools the current-carrying wire, thereby reducing the chance of breakage due to current induced heat.

In prior art flushing systems, flushing fluid flow has been provided by a single multi-stage centrifugal pump that supplies a flow that is divided to provided fluid to both upper and lower flushing nozzles. The automatic control of such pumps in prior art devices has been somewhat arbitrary due to the lack of a specific relationship between the pump operating speed and the pressure or flow output. In addition, differences in flow required through upper and lower nozzles must be achieved through manual control of valves positioned in the supply lines feeding the upper and lower nozzles by the machine operator.

SUMMARY OF THE INVENTION

It is a general object of this invention to provide an improved flushing system for an electrical discharge machining apparatus, and to provide an improved control system for the flushing flow and achievement of higher pressures for improved performance.

According to one aspect of this invention, a flushing fluid control system for an EDM machine having first and second fluid outlets, or wire guide and flushing assemblies, includes means for independently controlling the flow characteristics of fluid at the first and second outlets. The means for independently controlling the flow at the first and second outlets includes means for a developing a first signal indicative of desired fluid characteristics at the first nozzle and a second signal indicative of desired fluid characteristics at the second nozzle. The system includes first and second pumps driven by first and second motors, respectively. The pumps are controlled in response to the first and second signals, respectively, to provide a flow output related in a known and definite manner to the speed of the motors. The motors are controlled to provide a one-to-one relationship between the value of the signal received and the speed at which the pump operates. In this way, the flow of the fluid is controlled by the signal developed by the numerical control. The first and second pumps are preferably positive displacement pumps which have a fixed relationship between pump speed and output flow.

By providing independently controlled flow to the first and second nozzles, the system is completely automated which eliminates the requirement of operator input to regulate fluid flow characteristics. This enables the flushing system to operate without manual intervention when the system is operating under programmed control.

It is an important feature of the present invention that the pump output can be controlled in such a manner as to provide a flow rate through the work gap that corresponds to that required by the operating conditions of the EDM machine. The choice of pump is therefore of some importance to the operation of the invention. A positive displacement pump is ideally suited to operation with this invention as the flow rate can be controlled directly by the speed of the motor used to drive the pump.

According to a second aspect of this invention, the control of the flow rate of the fluid from the first and second nozzles is dependent upon the mode of operation of the EDM machine. The control system operates in two control strategies, a pressure control strategy, or mode, and a flow control strategy, or mode. Absent a metering device to measure the actual flow rate of the fluid, the flow rate control strategy operates open-loop. The pressure control strategy can operate open or closed-loop depending on whether pressure transducers are utilized to measure the actual pressure of fluid in the separate circuits. The control system operates to control flow at low flow rates and to control pressure at high flow rates. Accordingly, the signals developed by the numerical control are indicative of a desired flow rate at low flows and pressure at high flow rates.

The different control strategies are useful for the different operating conditions of the EDM machine. For example, during a rough cut operation, the object is removal of the workpiece metal at high speed operation of the machine, without sacrifice of cutting accuracy. In such an operation, the flushing assembly is close to the workpiece and a high pressure flow is desired in order to clear the working gap of eroded particles. With the exception of the width of the working gap, the nozzle opening is almost completely covered by the workpiece. The covering of the nozzle opening provides a resistance to flow. This creates a back pressure in the flow which can be sensed upstream near the pump. A control strategy based on pressure control is therefore useful in such a flow situation.

In contrast, during a skim cut operation, the object is removal of a minute layer of metal in order to obtain the precise dimension of the final product. Very little resistance to flow is encountered in the skim cut, or finishing cut. Moreover, only a portion of the nozzle opening is covered by the workpiece. Thus, very little back pressure is created in the flow stream. A control strategy based on flow control, and not a feed back of a measurement of pressure, is therefore useful in such a flow situation.

BRIEF DESCRIPTION OF THE DRAWINGS

For a more complete understanding of this invention, reference should now be made to the embodiment illustrated in greater detail in the accompanying drawings and described by way of example only. In the drawings.

DETAILED DESCRIPTION OF THE DRAWINGS

Figure 1:
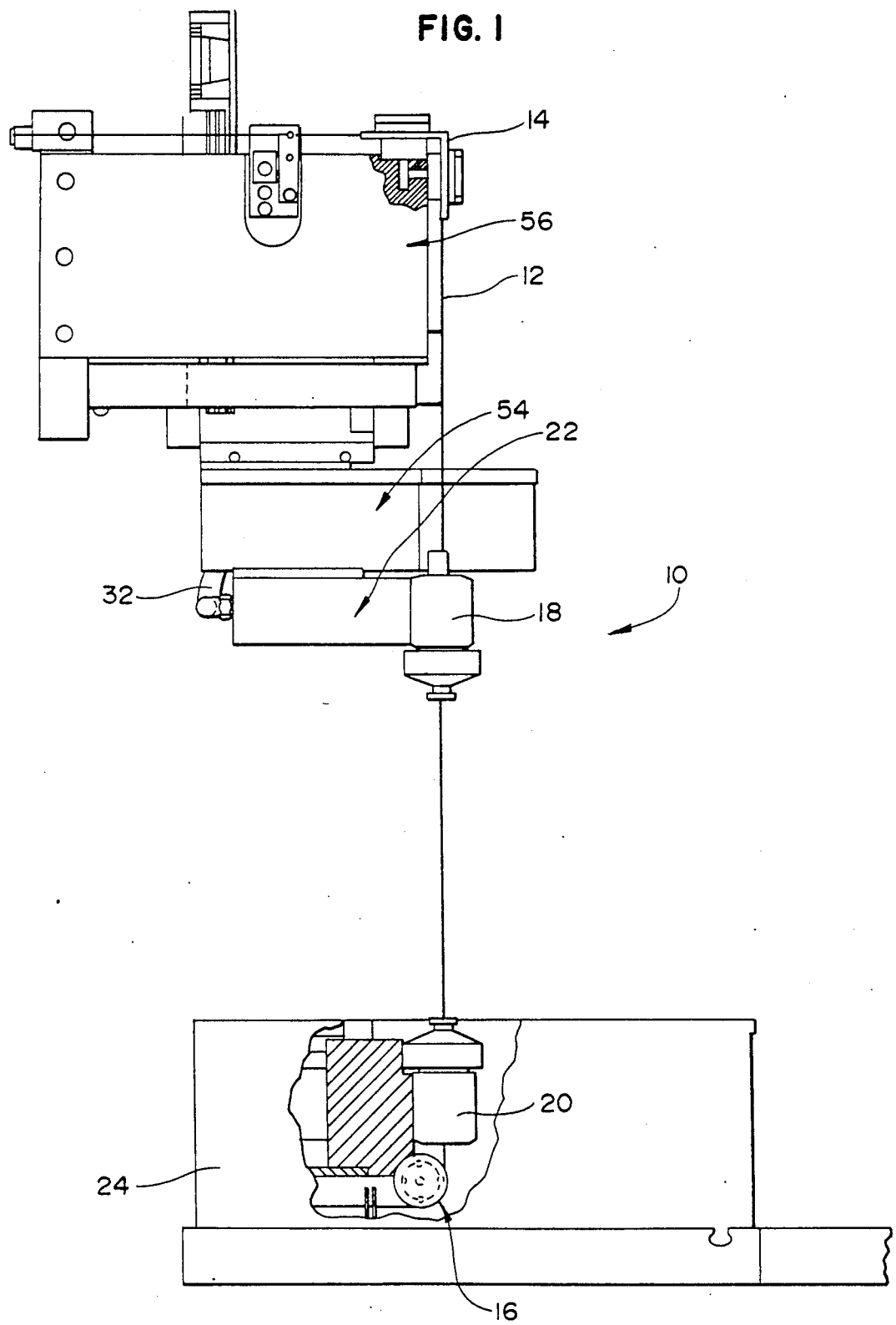
FIG. 1 is a schematic representation of a portion of an EDM machine suitable for use with the control system of this invention, showing the upper and lower electrode guide and flushing assemblies.
Figure 2:
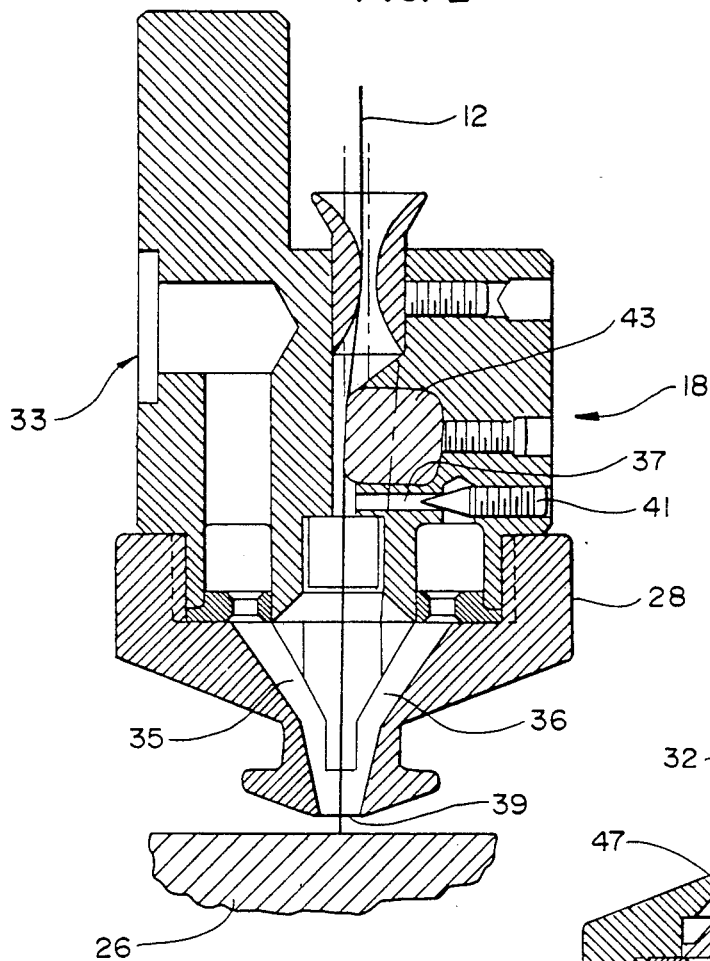
FIG. 2 is a section through the upper wire guide and flushing assembly illustrating the position of the wire and the workpiece.
Figure 3:
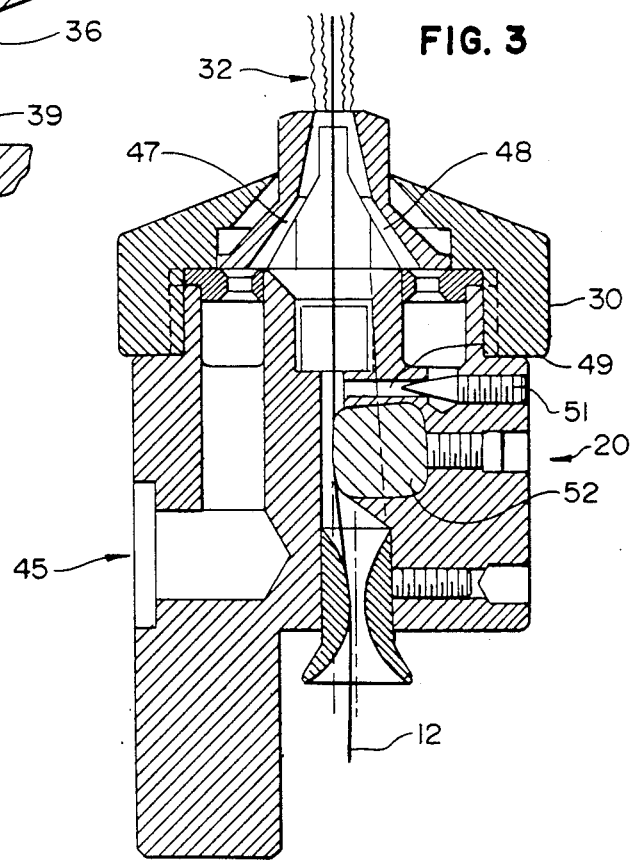
FIG. 3 is a section through the lower wire guide and flushing assembly illustrating the position of the wire and the general direction of fluid flow.

The control system of this invention regulates the flow of dielectric in an EDM machine and may be used with most EDM machines. Illustratively, an EDM machine generally designated 10 is shown in FIG. 1. The EDM machine 10 includes a wire electrode 12 that is maintained under tension between upper pulley 14 and lower pulley 16. Upper wire guide and flushing assembly 18 and lower wire guide and flushing assembly 20 are attached to upper guide arm 22 and lower guide arm 24, respectively, for manipulation of the wire electrode 12 to cut through a workpiece 26. The workpiece 26 is shown in FIG. 2. An upper nozzle portion 28 and a lower nozzle portion 30 attached to the upper and lower guide assemblies 18, 20, respectively, provide outlet ports through which dielectric fluid 32 flows along the wire electrode 12. FIGS. 2 and 3 show the approximate location of the wire 12 within the upper and lower guide assemblies 18, 20. FIG. 3 shows the general direction of the fluid discharge from the lower guide assembly 20.

As shown in FIG. 2, the nozzle 28 of the upper wire guide and flushing assembly 18 is typically positioned near the workpiece 26 during a rough cut operation. A rough cut is the initial cut through the workpiece and is undertaken with the wire almost entirely surrounded by the workpiece.

In a skim cut, or finishing cut operation, the nozzle 28 of the upper wire guide and flushing assembly 18 is generally pulled back a short distance from the workpiece. The skim cut is the final cut along the edge of the workpiece to trim the piece to within the desired tolerance. During a skim cut, only a portion of the wire is surrounded by the workpiece.

The nozzles 28, 30 provide fluid flow generally parallel to and coaxial with the wire. The fluid is provided to the upper guide 18 through a flush hose 32, shown in FIG. 1. Fluid fills the duct 33 within the upper guide. The duct 33 includes channels 35, 36, which constitute a continuous, cone-shaped piece, as well as conduit 37. A small quantity of fluid also flows along the wire from conduit 37 to the outlet 39. By travelling along the wire 12 in this manner, the fluid cools the wire and the wire guides (not shown). A metering pin 41 restricts the flow of fluid into the conduit 37. Of course, the vast majority of fluid from the upper nozzle 28 passes from the channels 35, 36.

A gap box (not shown) provides the electrical connection to the wire electrode in order to achieve the cutting discharge. The electrical contact 43 is shown contacting the wire 12 in FIG. 2. The flow through the flush pipe 32 to the nozzle 28 is regulated by a control system shown in greater detail in FIGS. 4 and 5.

The details of the lower wire guide and flushing assembly 20 are shown in FIG. 3. Fluid fills the duct 45 of the lower guide. As with the upper guide, the duct 45 of the lower guide includes channels 47, 48, which constitute a continuous, cone-shaped piece as well as conduit 49. The metering pin 51 restricts the flow of fluid into the conduit 49. The electrical contact 52 is shown in contact with the wire 12. The fluid also acts to cool the wire.

The upper guide assembly 18 and lower guide assembly 20 are shown with wire 12 in a portion of the overall EDM machine 10 in FIG. 1. The upper guide arm 22 travels in the u-v axis by means of u-v axis assembly 54. The u-v axis assembly is part of the upper bracket assembly 56.

The u-v axis assembly permits translation of the upper guide 18 in the u and v horizontal axes. In like manner, the lower guide arm 24 is operatively connected for translation of the lower guide 20 in the x and y horizontal axes. The wire 12 is fed horizontally and then vertically along the upper bracket assembly 56. Both the upper bracket assembly 56 and lower guide arm 24 include portions which are not shown in the drawings.

Figure 4:
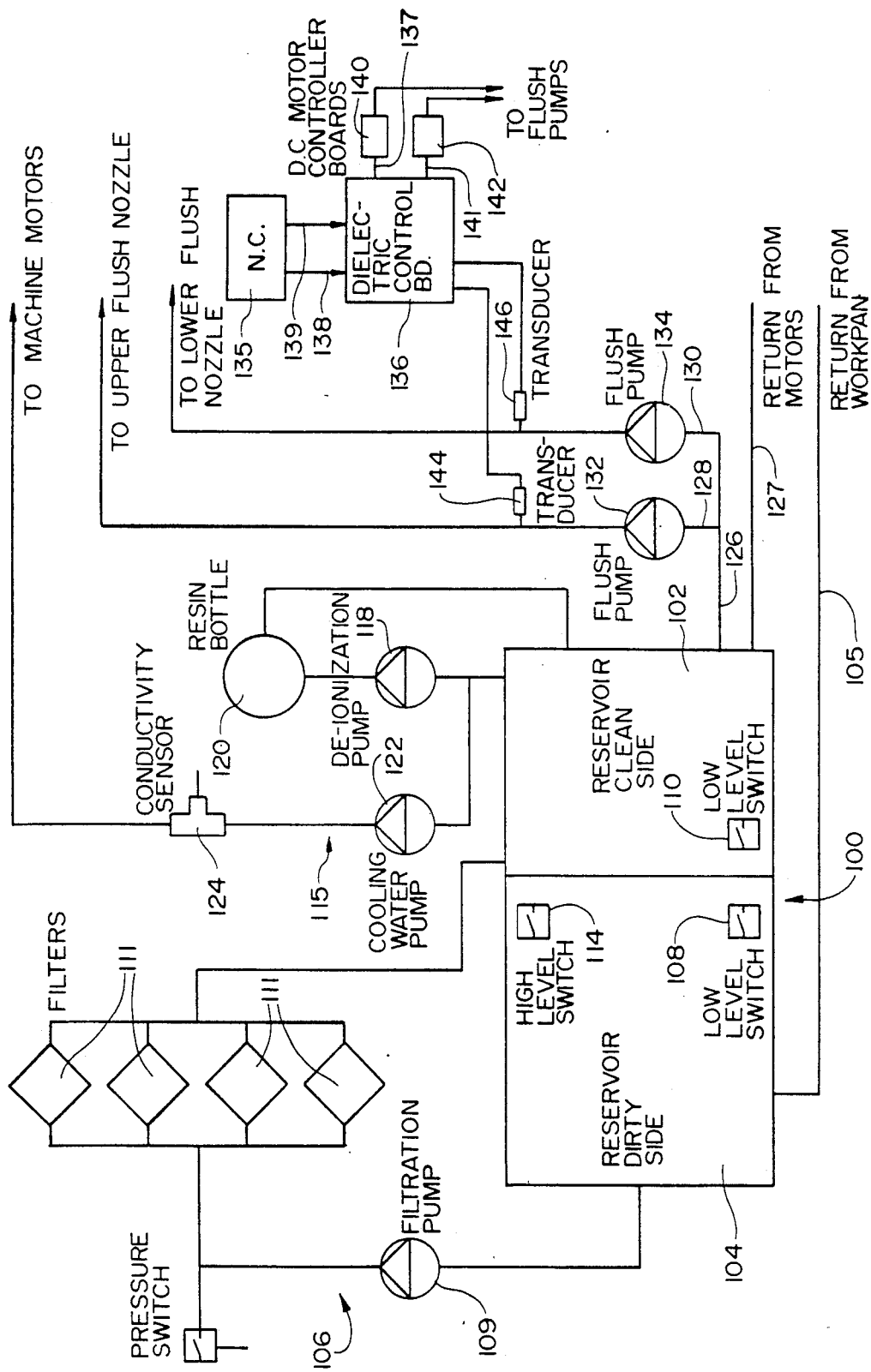
FIG. 4 is a schematic representation of the system used to control operation of the device of FIG. 1, including the fluid deionization, or regeneration, system; and, FIG. 5 is a block diagram illustrating the control system of the present invention.

FIG. 4 shows schematically the relationship between various parts of the system that control the flushing flow along the wire electrode 12, as well as the system for regeneration of the fluid. A reservoir 100 for collecting the flushing fluid 32 passing from the work area, has a 'clean' water section 102 and a 'dirty' water section 104. The 'clean' water section 102 contains de-ionized, uncontaminated water, at a conductivity level suitable for spark discharge and cutting. The 'clean' water is utilized for flushing the workpiece and cooling the machinery motors. Used fluid is passed by the workpiece and returned to the 'dirty' section 104 of the reservoir 100 from where it is pumped through a purification circuit 106 before being returned to the 'clean' section 102. The reservoir 100 has a first low level switch 108 to indicate a low level of 'clean' water in the 'clean' section 102 of the reservoir 100 and a second low level switch 110 to indicate a low level of 'dirty' water in the 'dirty' section 104 of the reservoir 100. The 'dirty' section also includes a high level switch 114 to indicate a high level of 'dirty' water.

The liquid flushing fluid 32 is discharged into the working area in the form of a jet. The fluid flowing from the working area is collected and returned to the dirty-water tank 104 by means of a conduit, shown diagrammatically as line 105. The fluid, contaminated by the eroded particles and partially ionized, is delivered by a filtration pump 109 through a series of filters 111 to clean-water tank 102. The clean fluid, which no longer has the eroded particles, is removed from the clean water tank 102 on line 126. The line branches to form lines 128 and line 130 that feed fluid to a first flush pump 132 and a second flush pump 134. The first flush pump 132 and the second flush pump supply fluid to the upper flushing nozzle 28 and lower flushing nozzle 30, respectively. The fluid is delivered in jets for flushing the working zone.

A cooling water pump 122, pumps water from the 'clean' side of the reservoir 102 to the machine motors in order to cool the motors. Before reaching the motors, the fluid is passed through a conductivity sensor 124. This conductivity sensor 124 continuously monitors the conductivity of the flushing fluid to determine if the conductivity, or ionization, is within the appropriate range. The conductivity sensor actuates the use of the purification, or de-ionization circuit 115, which includes a de-ionization pump 118 to pump the water around the circuit and a resin bottle 120 that reduces ionization of the water. When the conductivity level is above a certain level the water is pumped by deionization pump 118 through the resin bottle 120 to reduce the conductivity. The resin bottle 120 provides a synthetic resin over which the water, or flushing fluid, flows and which separates the positive and negative ions from the water. When the conductivity level is below the required level, the de-ionization pump is switched off so that water no longer flows through the de-ionization circuit 115. In this manner the conductivity of the water in the 'clean' section of the reservoir is maintained at the level required to ensure a constant cutting profile. The fluid returns from the motors to the "clean" side by line 127.

Water from the 'clean' section 102 of the reservoir 100 also exits the reservoir 100 on line 126. The line branches to form lines 128 and 130 that feed water to a first flush pump 132 and a second flush pump 134, respectively. The first and second flush pumps 132, 134 supply water to the top nozzle and bottom nozzle, respectively. The first and second flush pumps 132, 134 are controlled by a dielectric control board 136. This board receives signals on input lines 138, 139 and regulates the output of the first and second flush pumps 132, 134 in accordance with the signals received.

The signals on lines 138, 139 originate at an operator control board 135, or a numerical control system, depending upon whether the EDM machine is controlled in the manual or programmed mode. In manual operation, the operator determines, largely through experience, the flushing flow rate through the work piece necessary for different operating requirements. Operation can be programmed once the desired characteristics of operation are known usually through initial manual operation, so that the flow characteristics through the upper and lower nozzles 28, 30 are automatically determined for a desired cutting profile.

The pair of wire guide and flushing assemblies 18, 20 provide flow from above and below the workpiece in order to improve the flow through the work gap to ensure that debris is removed at the required rate. The flows through the upper nozzle 28 and the lower nozzle 30 are regulated individually to counteract the effects of gravity on the flow through the lower nozzle 30 and to allow efficient operation in modes in which differing flow characteristics are preferable at the different nozzles. For example, in skim cutting and entry cutting there is minimal resistance to flow by the workpiece and flow through one nozzle, usually the upper, may be sufficient. It may, however, be beneficial to also provide a minimal flow through the lower nozzle 30. With a single pump providing the same flow rate to both nozzles, as is the case in typical prior art fluid control systems, either the flows at both nozzles are the same resulting in efficiency losses, or manual adjustment to the flows through valves located in the supply lines to the nozzles must be made. The latter option requires manual adjustment even during programmed operation of the EDM machine.

Figure 5:
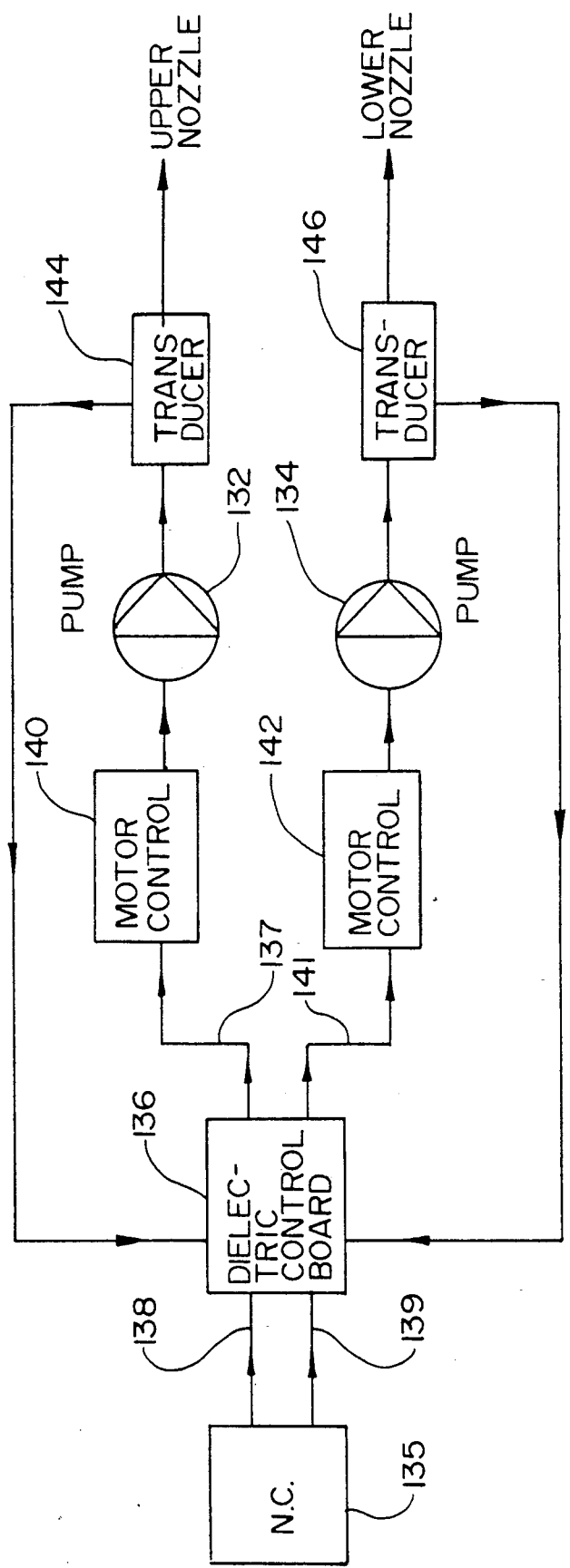

With the control system of this invention, which is illustrated in the block diagram of FIG. 5, independent control is achieved through the dielectric control board 136 that operates in accordance with signals received on the lines 138, 139 from the N.C. 135. The dielectric control board 136 provides a first signal on line 137 to a first D.C. (direct current) motor control board 140 that regulates the first flush pump 132 and a second signal on line 141 to a second D.C. motor control board 142 that controls the second flush pump 134. The operator control board or numerical control system 135 provides the input signals on lines 138, 139 that accomplish the required flow rate through the upper and lower nozzles for efficient operation of the EDM machine.

The dielectric control board 136 provides a 16-bit input to each D.C. motor control board 140, 142 in accordance with signals received on the lines 138, 139. Each D.C. motor control board 140, 142 outputs an analog voltage in the range 0–10 volts to the flush pump it controls. The motor of the pump is operated at a speed of revolution of between 0–1800 rpm; at speeds greater than 60 rpm, the motor operates in linear relation to the input voltage. The output flow of the displacement pump is a linear relationship with the rate of revolution of the motor. The flow of the displacement pump is thereby driven in accordance with signals derived from the dielectric control board. An A.C. (alternating current) motor controller board and an inverter can be used in replace of each of the D.C. motor controller boards.

The flush pumps 132, 134 are positive displacement pumps, commercially available from Wanner, that operate with about 5% ripple. This type of pump allows a steady flushing flow to be achieved around and along the length of the wire electrode 12. Other positive displacement pumps having suitable ripple characteristics and a set relationship between rate of revolution and flow output could be substituted.

The use of a positive displacement pump provides advantages in addition to those of reliable flow output.

A positive displacement pump is able to withstand higher pressures than conventional centrifugal pumps. As high pressures are required to remove debris at a sufficiently rapid rate in order for the EDM machine to operate at high speeds, the use of positive displacement pumps allows greater speed of operation to be achieved than conventional pumps. The preferred operation of this system is at pressures of up to 300 psi, but can be used at higher pressures up to 1000 psi. Subject to improvements in areas such as spark production, the displacement pump arrangement can allow further increases in operating rate.

In accordance with a second feature of this invention, the control system operates in one of two strategies, that is, a pressure control strategy and a flow control strategy. The flow control strategy, or mode, is preferably used at low flow rates in the range of between 0-¾ gallon per minute. The pressure control strategy, or mode, is preferably used at flow rates greater than ¾ gallon per minute. The flow rate control is used in modes when low flow rate is desirable such as during trimming and entry cutting where there is minimal resistance to flow by the work piece. During most other operations, the pressure control strategy is used. It is another feature of this operation that the signals on lines 138, 139 represent flow rates when the flow rate is below the threshold level and represent pressures when the flow rate is above the threshold level. The threshold can of course be changed from the ¾ gallon level if required. A switching means is present in the numerical control 135 to allow selection of the flow control strategy or pressure control strategy.

The flow rate control strategy of this embodiment operates open loop on the basis of the relationship between the signals input to the flush pump and the resulting output.

In the embodiment illustrated, the pressure control strategy is closed loop. The dielectric control board receives signals from first and second pressure transducers 144, 146 as well as from the numerical control circuit 135 or operator control board on lines 138, 139. The readings from the pressure transducers 144, 146 are fed to the dielectric control board 136. The dielectric control board 136 receives signals from the pressure transducers giving the actual pressure output of the first and second pumps, and signals on lines 138, 139 giving the desired pump output pressures and provides output signals to the D.C. motor control boards 140, 142 to control the outputs of the first and second flush pumps 132, 134 in accordance with the difference between the desired and the actual flow pressures. The pressure transducers 144, 146 are optional although they are preferably positioned approximately half-way between the pump and the nozzles and are shielded from electrical noise created by the machine. The closed-loop hardware, including the pressure transducers 144, 146, can be eliminated in systems where the relationship between pump motor speed and pressure output is reliable.

The control system of this invention provides independent automated control of the fluid flow from a pair of nozzles along a wire electrode of an EDM machine. The pressure or flow rate of the flushing fluid can be regulated through signals received from the EDM operating system. The system enables the flow rate to be regulated by flow rate or pressure in accordance with operating conditions of the EDM machine. When operation of the EDM machine is programmed controlled, the EDM machine is totally automatically controlled through signals derived from the profile control system of the machine.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A control system for an electro-erosion machine tool having a translatable filamentary erosion electrode and spaced first and second electrode guide and fluid delivery means, said first electrode guide and fluid delivery means having a first outlet for discharging fluid in a first direction generally along said electrode, said second electrode guide and fluid delivery means having a second outlet for discharging fluid in a second direction generally along said electrode, said control system comprising:
    means for developing first and second electrical signals in response to required fluid conditions at said first and second outlets, said first and second electrical signals representing a flow rate at said required flow conditions below a threshold flow rate and said first and second electrical signals representing a pressure at said required flow conditions above said threshold flow rate;
    first means for controlling the fluid flow output of said first outlet in response to said first electrical signal, said first fluid flow output control means including a first motor means for developing a first pump control signal, said first motor means being responsive to said first electrical signal, and a first pump responsive to said first pump control signal to provide said required fluid flow conditions at said first outlet; and
    second means for controlling the fluid flow output of said second outlet in response to said second electrical signal, said second fluid flow output control means including a second motor means for developing a second pump control signal, said second motor means being responsive to said second electrical signal, and a second pump responsive to said second pump control signal to provide said required fluid flow conditions at said second outlet.

2. The control system of claim 1 wherein said first and second pumps are positive displacement pumps.

3. The control system of claim 2 wherein said first and second pumps are operated at 300 psi.

4. The control system of claim 1 wherein each of said first and second motor means includes a D.C. motor controller device.

5. The control system of claim 1 wherein each of said first and second motor means includes an A.C. motor controller device and inverter.

6. The control system of claim 1 including first transducer means for developing a third electrical signal representative of the pressure at said first outlet, and
    second transducer means for developing a fourth electrical signal representative of the pressure at said second outlet, said first and second pump control signals being altered in response to said third and fourth electrical signals.

7. The control system of claim 1 including selecting means for operating said first and second fluid flow output control means in a plurality of operating modes in response to one of said first and second electrical signals representative of a predetermined flow rate, said operating modes including a fluid pressure control mode and a fluid flow rate control mode.

8. A control system for an electro-erosion machine tool having a translatable filamentary erosion electrode and spaced first and second electrode guide and fluid delivery means, said first electrode guide and fluid delivery means having a first outlet for discharging fluid in a first direction generally along said electrode, said second electrode guide and fluid delivery means having a second outlet for discharging fluid in a second direction generally along said electrode, said control system comprising:

means for developing a first electrical signal in response to required fluid flow conditions at said first outlet;

means for developing a second electrical signal in response to required flow conditions at said second outlet;

first means for controlling the fluid flow output of said first outlet in response to said first electrical signal;

second means for controlling the fluid flow output of said second outlet in response to said second electrical signal; and, selecting means for operating said first and second fluid flow output control means in a plurality of operating modes in response to one of said first and second electrical signals being representative of a predetermined flow rate, said operating modes including a fluid pressure control mode and a fluid flow rate control mode, said selecting means operating in said fluid pressure control mode at said required fluid flow conditions above a threshold flow rate, and said selecting means operating in said fluid flow rate control mode at said required fluid flow conditions below said threshold flow rate.

9. The control system of claim 8 wherein each of said first and second electrical signals represent flow rates during operation in said fluid flow rate control mode, and each of said first and second electrical signals represent fluid pressures during operation in said pressure control mode.

10. The control system of claim 9 wherein said first fluid flow output control means includes a first motor means for developing a first pump control signal, said first motor means being responsive to said first electrical signal, and a first pump responsive to said first pump control signal to provide said required fluid flow conditions at said first outlet, said second fluid flow output control means includes a second motor means for developing a second pump control signal, said second motor means being responsive to said second electrical signal, and a second pump responsive to said second pump control signal to provide said required fluid flow conditions at said second outlet, and first transducer means for developing a third electrical signal representative of the pressure at said first outlet, and second transducer means for developing a fourth electrical signal representative of the pressure at said second outlet, said first and second pump signals being altered in response to said third and fourth electrical signals.

* * * * *